US008289994B2

(12) United States Patent
Abdallah

(10) Patent No.: US 8,289,994 B2
(45) Date of Patent: Oct. 16, 2012

(54) SYSTEM AND METHOD FOR WIRELESS SIGNAL COMMUNICATION IN AN OIL FIELD ENVIRONMENT

(75) Inventor: Raed H. Abdallah, Houston, TX (US)

(73) Assignee: vMonitor LLC, Houston, TX (US)

( * ) Notice: Subject to any disclaimer, the term of this patent is extended or adjusted under 35 U.S.C. 154(b) by 1319 days.

(21) Appl. No.: 11/931,842

(22) Filed: Oct. 31, 2007

(65) Prior Publication Data

US 2009/0110107 A1    Apr. 30, 2009

(51) Int. Cl.
*H04J 3/16* (2006.01)
(52) U.S. Cl. ......................................... 370/465; 340/500
(58) Field of Classification Search ........................ None
See application file for complete search history.

(56) References Cited

U.S. PATENT DOCUMENTS 7,301,474 B2    11/2007  Zimmerman
2008/0031139 A1*  2/2008  Muro et al. .................... 370/237

* cited by examiner

*Primary Examiner* — Kevin C Harper
(74) *Attorney, Agent, or Firm* — G. Michael Roebuck

(57) ABSTRACT

A method is disclosed for transmitting data in a wireless oil field environment, the method comprising sensing a signal change rate for an input signal from an oil field apparatus; selecting a real time transmission mode when the signal change rate is less than a predetermined value; selecting a buffered data transmission mode when the signal change rate is greater than or equal to the predetermined value; and transmitting the data in the selected transmission mode from a wireless oil field environment. A system is disclosed for performing the method.

16 Claims, 8 Drawing Sheets

SYSTEM AND METHOD FOR WIRELESS SIGNAL COMMUNICATION IN AN OIL FIELD ENVIRONMENT

BACKGROUND

1. Field of the Disclosure

The field of the present disclosure relates to wireless data transmission in an oil field environment.

2. Background

The exploitation of hydrocarbon reserves includes several phases including production and processing at a well site. Well site activities include monitoring of several parameters of the well site to ensure safety at the site and surrounding areas and to ensure the produced hydrocarbon products, either at the raw product stage or during or after well site processing, have a desired quality.

Information obtained by well site monitoring is used by well site personnel and by off-site personnel and customers for various purposes, including control of the well site and recording various production and well site parameters.

SUMMARY

A method is disclosed for transmitting data in a wireless oil field environment, the method comprising, sensing a signal change rate for an input signal from an oil field apparatus; selecting a real time transmission mode when the signal change rate is less than a predetermined value; selecting a buffered data transmission mode when the signal change rate is greater than or equal to the predetermined value; and transmitting the data in the selected transmission mode from a wireless oil field environment. A system is disclosed for performing the method.

BRIEF DESCRIPTION OF THE DRAWINGS

For detailed understanding of the present disclosure, references should be made to the following detailed description of the several illustrative embodiments, taken in conjunction with the accompanying drawings, in which like elements have been given like numerals and wherein.

DETAILED DESCRIPTION OF ILLUSTRATIVE EMBODIMENTS

Figure 1:
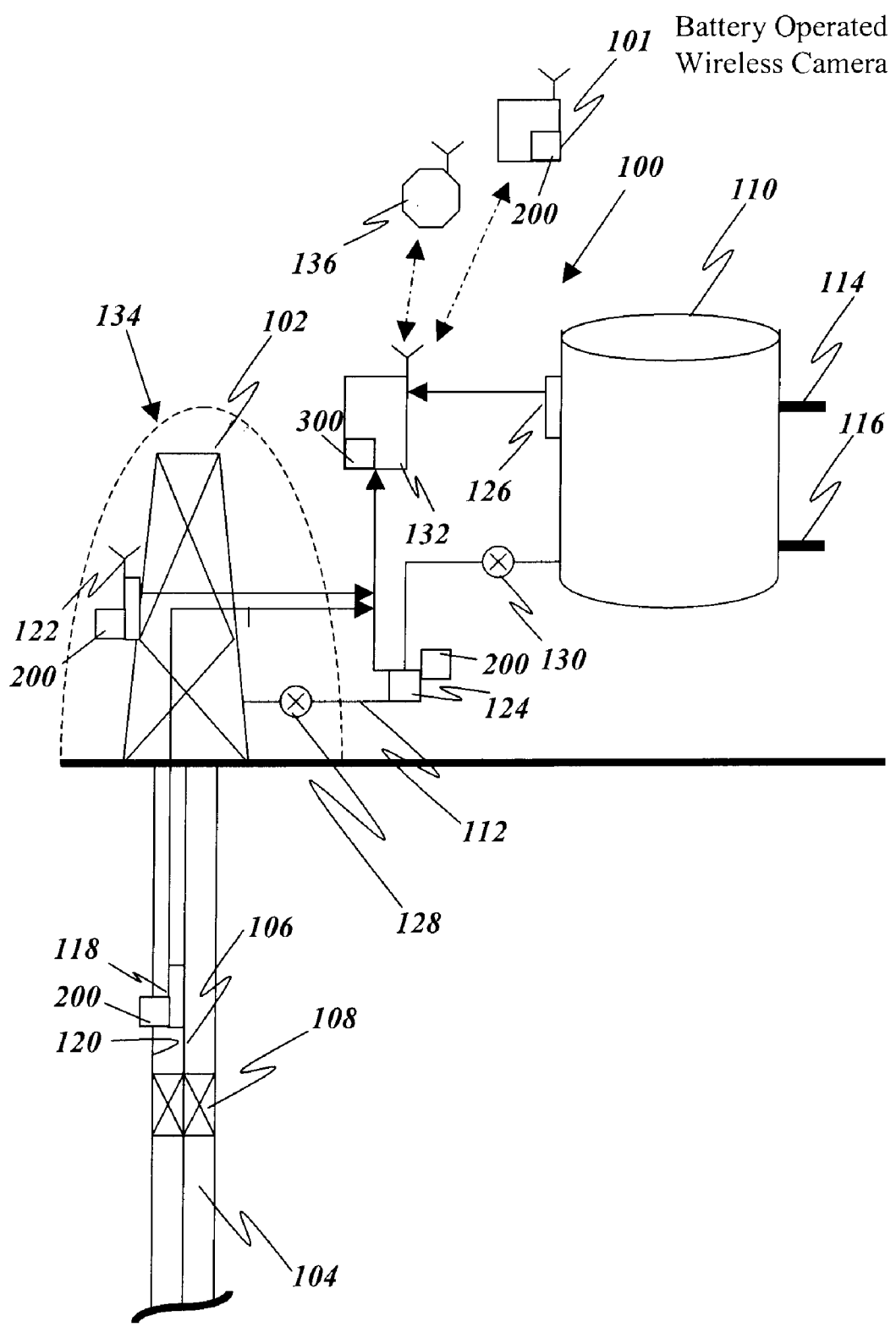
FIG. 1 is an illustration of a wireless transmitter and receiver deployed in an oil field production well in an illustrative embodiment.

Portions of the present disclosure, detailed description and claims may be presented in terms of logic, software or software implemented aspects typically encoded on a variety of computer readable media including, but not limited to, computer-readable media, machine-readable media, program storage media or computer program product. Such media may be handled, read, sensed and/or interpreted by a computer or information processing device. Those skilled in the art will appreciate that such media may take various forms such as cards, tapes, magnetic disks, and optical disks. Examples of magnetic disks include floppy disks and hard drives, and examples of optical disks include compact disk read only memory ("CD-ROM") and digital versatile disc ("DVD"). It should be understood that the given implementations are illustrative only and do not limit the present invention.

Some portions of the present disclosure, detailed description and claims use the term information, data, message, and these terms may be used in the singular or plural form. The term information as used herein refers to any information relating to well site monitoring and may include any one or combination of data, signal, message, command, and response, any of which may be analog or digital and may be communicated by wireless or wired transmission.

In a particular illustrative embodiment, one or more wireless transmitters are coupled or connected to an analog input or digital input device, such as an oil field apparatus such as a pressure sensor, communicating data to one or more wireless receivers connected to an analog output or digital output device. The wireless transmitter and receiver can be housed in a package suited or housing for industrial areas. The housing is a gas tight box in one embodiment. In another embodiment the wireless transmitter includes but is not limited to a main controller board, one more digital input input/output (IO) channels, one more analog input IO channels, a radio unit, and an antenna mounted to the housing and a power source (i.e. battery pack). The wireless receiver includes but is not limited to a main controller board including a processor and a computer readable medium containing data and a computer program, one more digital input IO channels, one more analog input IO channels, a radio unit, an antenna mounted on the housing and a power source (i.e., battery pack). In another embodiment a system is provided having at least one transmitter/receiver set, a number of transmitters communicating with a single receiver set, two or more sets of any combination of thereof.

A particular embodiment replaces cabling for applications that use a high data rate sampling (1 to 1000 MHz per second or more) using external or internal serial radio frequency (RF) radio or transmission control protocol (TCP) wireless Radio. In these high data rate applications substantially every change in value in the data input to the transmitter from the source (e.g., oil field apparatus) is detected, recorded and transmitted to the receiver where the change is output to a transmitter output channel. The output of the transmitter is received by a receiver system and output in a prescribed protocol or data type (digital or analog). Another particular embodiment detects and transmits substantially every change in value from the input source. A particular embodiment maintains the signal modulation width and preserves the signal detected at the input source and reproduces input signal at the output channel at the receiver system. There can be a delay in time between when the input source detects the signal change and when the receiver outputs the signal value.

A particular embodiment substantially optimizes data communication between the transmitter and receiver to reduce data traffic. In a particular embodiment, a wireless transmitter and sensor are provided that read analog and digital data. The data input to the transmitter is transmitted wirelessly to a wireless receiver. In a particular embodiment, a main controller, radio, one or more sensors (or one or more analog or digital input channels connected to external sensors), a radio, an antenna, a battery pack (optional can be powered by external source) and in a housing. A wireless receiver is provided that receives the input signal from one or more wireless transmitters. The wireless receiver provides a main controller, a radio, one more analog or digital output channels, a radio, an antenna, a battery pack (optional can be powered by external source) and a housing.

In another embodiment, the input signal is read from the wireless transmitter in different formats (i.e. 4-20 milliamps, 1-5 v, 0/1 digital input, etc). In another embodiment, as the wireless transmitter sends the data to the wireless receiver the transmitter designates the type of data transmitted (i.e. 4-20 milliamps, 1-5 v, 0/1 digital input, etc). In another embodiment, the wireless receiver is configured to output the signal in any format desired (i.e. 4-20 mA, 1-5 v, 0/1 digital input, etc). In another embodiment the main controller unit for the transmitter is configured for continuous reading (sampling up 1000 or more readings per second) of one or more input channels. In another embodiment, the main controller unit is configured to detect signal changes in any of the input channels and immediately transmit the new value to the wireless receiver. In another embodiment, the main controller unit is configured to read incoming data from one or more transmitters and immediately output the data to a designated output channel.

In another embodiment, a main controller unit is configured to transmit data at predefined period (normally 1 sec) to the wireless receiver. Every 1 second (or whatever the defined period is) any change in the input signal is detected and stored to preserve the signal duration and signal value and substantially all the changes in the input signal are stored in a transmission data buffer. At the end of the transmit period all the changes in the input signal along with the width of each change are transmitted to the wireless receiver. In another embodiment, the main controller unit is configured read to incoming buffered data in the transmission data buffer and sequentially output the signal from the incoming buffer data to the designated output channel for that transmitter to preserve and enable replication of the signal width and value.

In another embodiment, the transmitter reads incoming data fast enough to ensure that the radio incoming transmission data buffer does not over flow. One way to do this is to have a dedicated thread that simply reads data from the incoming serial buffer and moves the data to another data buffer so that other threads (i.e., the outputting signal thread) to read it and perform some action with it (i.e., output the data to the output channel). In another embodiment, there is more than one of wireless receiver, each of which receives data from one or more wireless transmitters. In another embodiment, to reduce wireless traffic and wireless data collisions, transmitter radios of different frequencies are provided or radios with the same frequency but with different communication channel settings are provided.

In another embodiment, a messaging protocol is provided and used between the transmitter systems and receiver systems to identify messages from the different transmitters/receivers, error detection/correction, identify message types, pair input/output channels, etc. The messaging protocol consists of a message header, message body and message footer. In another embodiment, there are two types of techniques or transmission mode used in signal replicating and transmission. The first transmission mode is the real time transmission mode that is utilized for low frequency signals or signal change rates (for example, a signal change rate less than 10 Hz per second) and other for high frequency signals or signal change rate (for example, a high change rate greater than or equal to 10 Hz per second). The signal change rate at which different transmission modes are selected can be higher than 10 Hz, for example, instead of 10 Hz, another embodiment switches at 100 Hz and another embodiment switches transmission modes at 1000 Hz and yet another embodiment switches transmission modes at 1 Kilo Hz.

In low frequency applications the transmitter is substantially continuously scanning the input channels for changes in value. Whenever a change in the signal value is detected the changed value is immediately transmitted to the receiver. At the receiver the low frequency message reporting the changed value is immediately output to the output channel. In high frequency applications the transmitter continuously scans the input channels for change in value. However instead of immediately transmitting the value to the receiver system, the value is stored in a transmission data buffer. After a predefined X time (can range from 1 sec to x minutes) the transmitter will send all the detected signal changes in the data buffer to the receiver. To preserve data integrity and signal width the time length for each signal or changed a data value is transmitted as well.

At the receiver system, once the message is received the receiver starts outputting the values as they are stored in the transmitted data buffer. The receiver uses the time length associated for each value to determine how long to wait before outputting the next value in the data buffer. With this method every x time or period the transmitter sends all the data representing changes detected and the receiver uses a "play back" technique to out put these data representing changed values to reproduce the signals as detected at the transmitter. In another embodiment, to preserve data integrity for high frequency signal change rates a sampling duration, such as a 1 second sampling duration, is divided into internals. In another embodiment them number of internals is equal to the maximum number of scanning channels available on the transmitter. Thus if the maximum scan rate for channel is 500 samples per second then each sampling duration of 1 second is divided into 500 internals. Each second (or sampling duration) the transmitter transmits all changed data values and a bit stream indicating intervals in which a value change was detected. So if there was a change value during intervals 5, 50, 100, 200, 311 of the 500 intervals during the sampling duration, then a table of data is sent representing the N bits and the changed values. The receiver outputs the value received based on the bit marked interval. This way the input signal width is preserved in the output signal.

In another embodiment, the transmitter system automatically detects how fast the input value is changing and can auto switch between the instantaneous messaging (slow frequency) and buffered messaging (high frequency). In another embodiment, to cancel and reduce the noise impact the transmitter system provides a signal edge detection tolerance so it can detect and eliminate spurious, noisy, bogus or fake signals which can over flow the communication out put transmission channel if not detected. In another embodiment the size of a transmission buffer is monitored and a transmission mode selected based on avail able space in the transmission buffer.

In another embodiment, a method is disclosed for transmitting data in a wireless oil field environment, the method comprising sensing a signal change rate for an input signal from an oil field apparatus; selecting a real time transmission mode when the signal change rate is less than a predetermined value; selecting a buffered data transmission mode when the signal change rate is greater than or equal to the predetermined value; and transmitting the data in the selected transmission mode from a wireless oil field environment. In another embodiment of the method, the buffered data transmission mode further comprises sending once per period, a data buffer of N data values representing the input signal when a condition is met; and sending once per period a data buffer of changed data values and a set of N bits indicating which of the N data values correspond to the changed data values when the condition is not met. In another embodiment of the method the condition further comprises data transmission buffer available space exceeding data buffer size by a predetermined margin. The margin can be set to 50 percent or any value from 1-100 percent, so that the available space in the transmission buffer is 50 percent (or another set percentage) larger than the data buffer size. The margin is be dynamically adjusted based on the signal change rate.

In another embodiment of the method, the method further comprising dividing a sampling duration into N intervals, wherein each of the N data values corresponds to one of the N intervals. In another embodiment of the method the set of N bits, bits representing a changed data value are set to one and all other bits are set to zero. In another embodiment of the method, the number of intervals, N is increased as the signal change rate increases. In another embodiment of the method, the predetermined margin is proportional to N. In another embodiment of the method, the data buffer further comprises N start time values and N stop time values corresponding to the N data values. In another embodiment the method further comprises receiving the data in the selected transmission mode; and outputting the received data as output data, wherein the input data and the output data are signals selected from the group consisting of digital, village and current.

In another embodiment, a system is disclosed for transmitting data in a wireless oil field environment, the system comprising a processor in data communication with a computer readable medium; a computer program embedded in the computer readable medium, the computer program comprising instructions to sense a signal change rate for an input signal from an oil field apparatus, instructions to select a real time transmission mode when the signal change rate is less than a predetermined value and instructions to select a buffered data transmission mode when the signal change rate is greater than or equal to the predetermined value and instructions to transmit the data in the selected transmission mode from a wireless oil field environment. In another embodiment of the system, In another embodiment of the system, the buffered data transmission mode further comprises instructions to send once per period, a data buffer of N data values representing the input signal when a condition is met and sending once per period a data buffer of changed data values and a set of N bits indicating which of the N data values correspond to the changed data values when the condition is not met.

In another embodiment of the system, the condition further comprises data transmission buffer available space exceeding data buffer size by a predetermined margin. In another embodiment of the system, the computer program further comprises instructions to divide a sampling duration into N intervals, wherein each of the N data values corresponds to one of the N intervals. In another embodiment of the system, the set of N bits, bits representing a changed data value are set to one and all other bits are set to zero. In another embodiment of the system, the number of intervals, N is increased as the signal change rate increases. In another embodiment of the system, the predetermined margin is proportional to N. In another embodiment of the system, the data buffer further comprises N start time values and N stop time values corresponding to the N data values. In another embodiment of the system, the computer program further comprises instructions to receive the data in the selected transmission mode; outputting the received data as output data, wherein the input data and the output data are signals selected from the group consisting of digital, voltage and current.

Turning now to FIG. 1, FIG. 1 is an elevation view of a well site 100 to illustrate a non-limiting example of a system according to the disclosure. The site 100 as shown includes a conventional well head 102 positioned at a producing well 104. The well 104 has disposed therein a production tube 106, which has been shut in by a barrier 108. The barrier 108 serves to isolate a lower portion of the well from an upper portion. In one example, the barrier 108 may be conventional packers.

The production tube 106 leads from within the well 104 to the well head 102 where the production tube connects to a product pipe 112. The product pipe 112, as shown, may lead to one or more tanks 110. The product pipe may include several valves 128, 130 for controlling fluid flow through the product pipe 112. The tank 110 may be used to temporarily store produced products. The product tank 110 may include one or several output pipes as illustrated in FIG. 1 by an upper output pipe 114 and a lower output pipe 116. The upper output pipe 114 may be used for example to recover light oils and gas from the tank 110, and the lower output pipe 116 may be used to recover heavier oils from the tank 110. Where the well site is a gas producing site, the tank 110 may be preceded by not-shown processing and pressurizing structures and devices. The tank 110, in the case of gas wells, may be a pressure vessel.

Continuing with FIG. 1, monitoring devices 118, 122, 124 and 126 are strategically located at several locations of the well site 100 to monitor any number of parameters relating to the produced products and/or well site tools. A transmission system 200 is included at each monitoring device. The monitoring devices can include a battery operated camera 101 for transmitting wireless video data to a receiving system. The camera stays in sleep mode unless motion is detected in associated motion detection. Upon detecting motion the camera wakes up, filing a predetermined video data segment duration and transmits the video data to a receiving system before going back to sleep. The monitoring devices may be in communication with a receiving system 300 at a local node gateway device 132 operating as a node controller. In several exemplary embodiments, the local node device includes output control interfaces coupled to well site tools such as the valves 128, 138 for controlling at least some operations at the well site. In a particular illustrative embodiment each monitoring device can be enclosed in a gas tight housing to prevent risk of an explosion due to electronic energy or spark igniting explosive gases near a monitored well. Each monitoring device can include one or more of a processor, computer readable media such as computer memory, database storage and a radio transceiver enclosed in the gas tight housing.

Portions of the well site as indicated by dashed line 134 may be designated as a hazardous or explosive zone due to, among other possible reasons, potentially hazardous or explosive gases or other products being produced at a particular well site 100. In some cases, the node controller 132 may be located outside of the predetermined hazardous or explosive zone. The gas tight housing reduces risk of explosions in the explosive zone.

Any number of useful monitoring devices may be employed at the well site 100 and at any number of locations. Non-limiting examples of monitoring devices and locations include one or more sensors 118 disposed within the borehole of the well 104 for monitoring down hole parameters of the well site. These down hole sensors may be permanently or temporarily disposed within the well 104. The down hole sensors 118 may be coupled to the outside of the production tube 106, to the inner flow channel of the production tube 106, inside a wall of the production tube 106, to or within a casing 120 or any combination of these or other possible down hole locations.

In other non-limiting examples, any combination of surface sensors may be used to monitor surface parameters of the well site 100. Surface sensors may include, for example, a sensor 122 for monitoring parameters at the well head 102, a sensor 124 for monitoring parameters in and/or along the surface production pipe 112, and a sensor 126 for monitoring parameters associated with the storage tank 110. Each of the sensors 122, 124 and 126 may be a single sensor or multiple sensors. Non-limiting examples of sensors include absolute and differential pressure sensors, temperature sensors, flow sensors, multi-phase sensors, optical sensors, nuclear sensors, gas detectors, motion sensors, imaging sensors such as video and/or still cameras or any combination of these and other sensors useful for monitoring well site operations. Any or all of these sensors may be analog or digital sensors. In the case of analog sensors, analog to digital converters may be employed at the well site or at the sensor location to aide in the transmission and processing of information obtained by the sensors.

In several non-limiting examples, the local node controller 132 may be placed in long-range wireless communication with a gateway device 136 for relaying information and messages to/from remote users or system devices such as a Supervisory Control and Data Acquisition (SCADA) system. In some cases it is desirable to communicate between a node monitoring device and the gateway 136. Therefore, the scope of the present disclosure includes communicating information to and from a monitoring device, which may be a sensor 122 or sensor cluster having a data communication with a communication device 132. In an illustrative embodiment the communication device 132 is a gateway, however, the communication device may also be any device capable of receiving and temporarily storing configuration message data in a mailbox for reading by another device or retransmission to another device.

Figure 2:
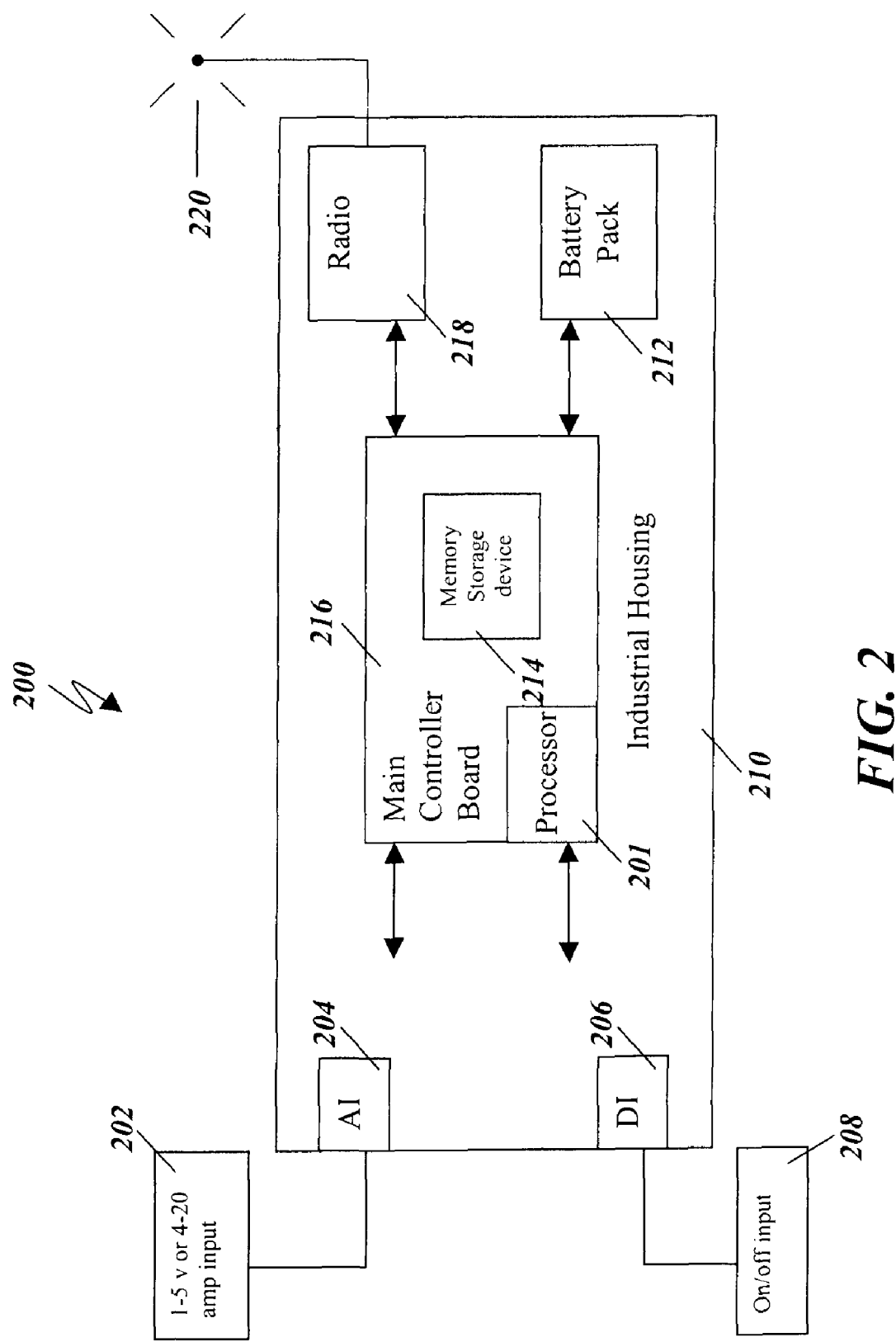
FIG. 2 is a schematic depiction of an transmitter system provided in an illustrative embodiment.

Turning now to FIG. 2, an illustrative embodiment of a transmission system is depicted. As shown in FIG. 2, transmission system 200 receives input from an analog device 202 in the form of 1 to 5 Volts or 4-20 milliamps. The analog input is provided by analog input device 204. The system 200 also receives digital input from a digital device 208 at digital input device 206. The system also includes a main controller board 216 which includes a processor and a computer readable medium 214 in which a set of computer readable instructions are stored in the computer readable medium for execution by the processor. The main controller board and processor are in data communication with transmitter radio 218 which transmits signals via transmitter antenna 220. A power supply or battery pack 212 is also incorporated into the system 200. An industrial housing 210 is provided for housing and detecting the transmitter system in a particular embodiment the housing 210 is a gas tight box or operating in an explosive environment.

Figure 3:
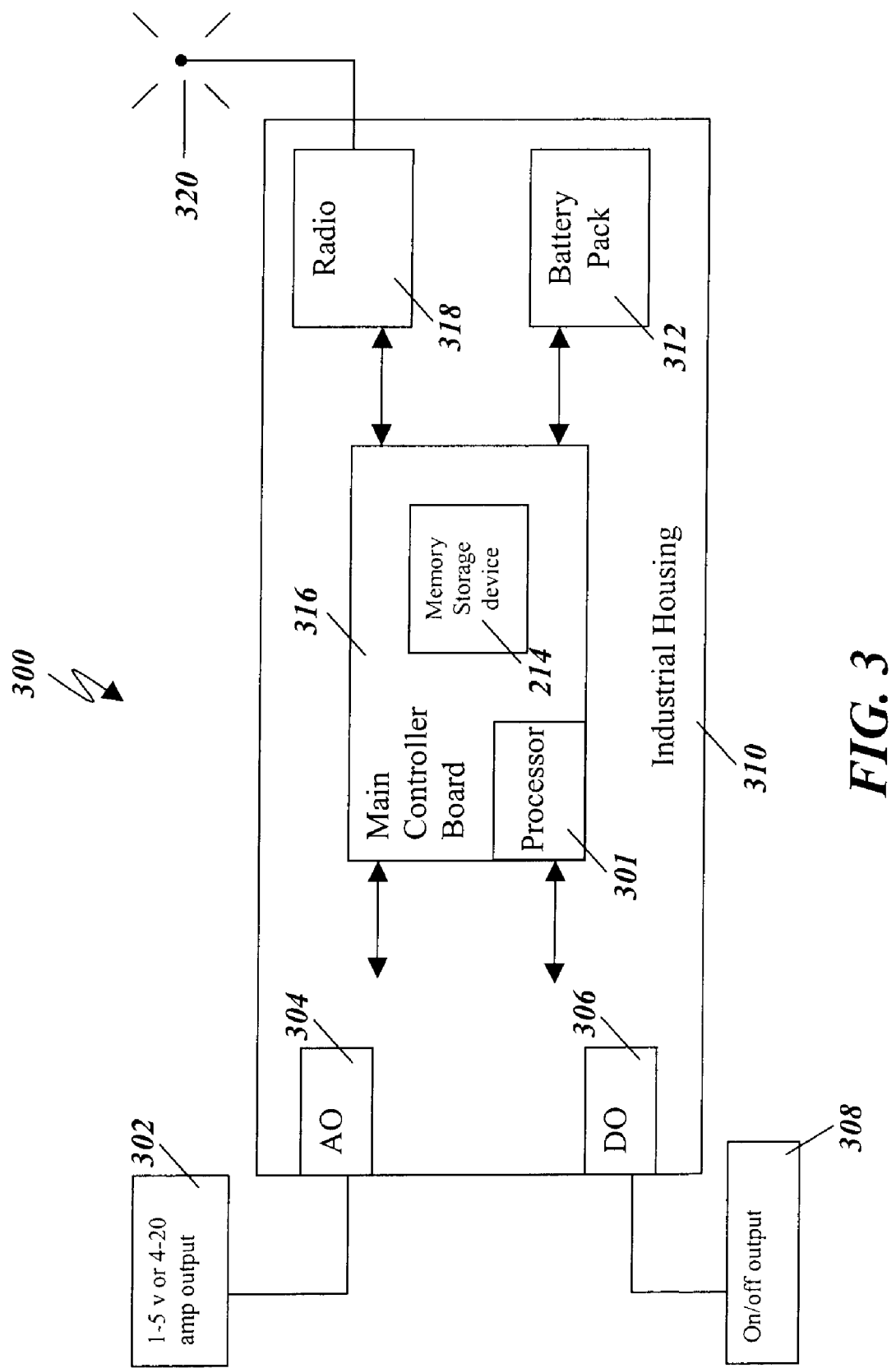
FIG. 3 is a schematic depiction of an receiver system provided in an illustrative embodiment.

Turning now to FIG. 3, a receiver system 300 is illustrated as provided in another illustrative embodiment. The receiver system receives signals from the transmitter system 100 via antenna 320. The antenna 320 is connected to a receiver radio 318 which is in data communication with a main controller board on the receiver system 300. The main controller board 316 includes a processor and a computer readable medium or memory storage device 114. The main controller board is in data communication with an analog output tool which outputs a configurable signal to analog output device 302. Analog output device outputs an analog signal consisting of a 1-5 volts or 4-20 milliamps output signal. Additional ranges of voltages and currents can also be used. The main controller board is also in data communication with a digital output device 306 which outputs a digital data stream via a digital output device 308.

Figure 4:
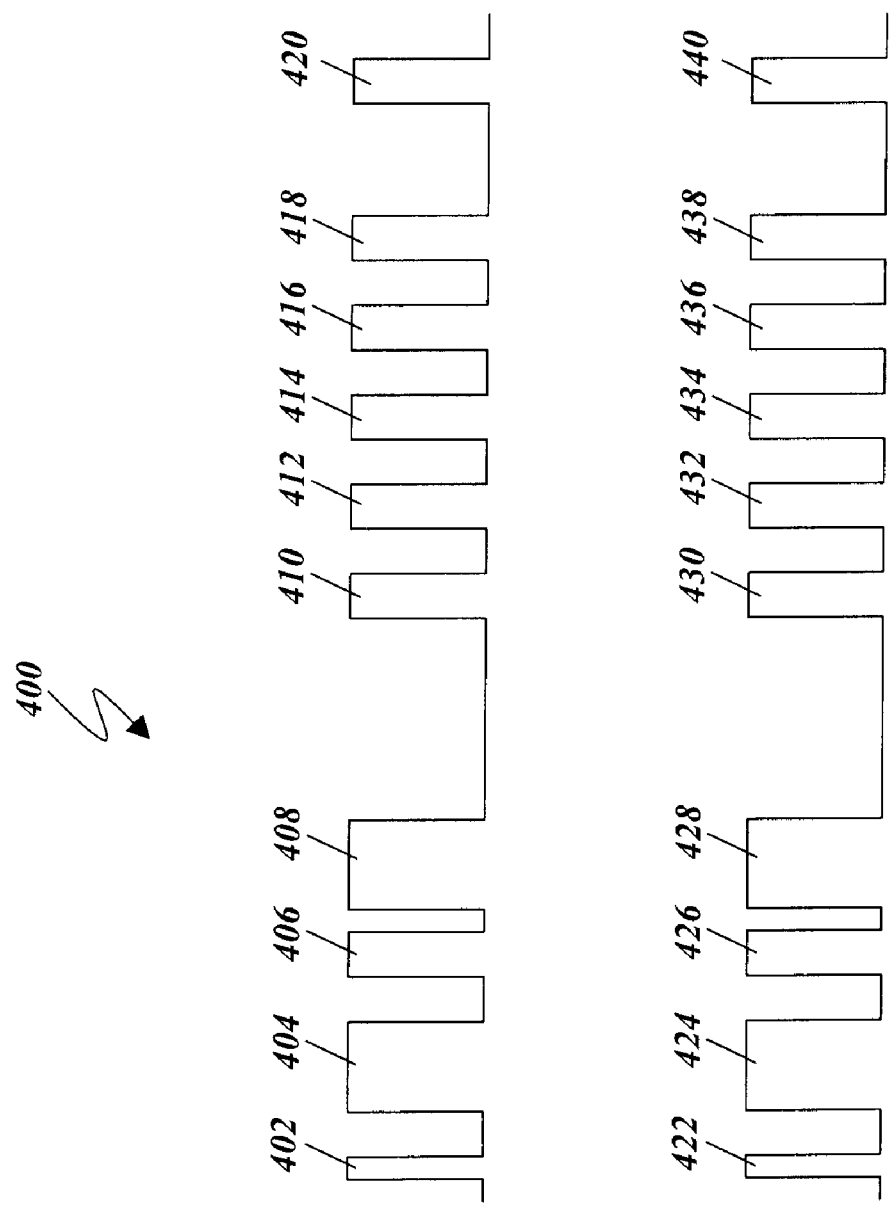
FIG. 4 is a schematic depiction of a replicated signal in another illustrative embodiment.

Turning now to FIG. 4, as shown in FIG. 4, a digital input data stream or analog signal is illustrated by the series of pulses 402, 404, 406, 408, 410, 412, 414, 416, 418 and 420. The analog or digital signals are received at the transmitter system 100 and transmitted by the transmitter system 100 to receiver system 200. The receiver system outputs the service of pulses is replicated by the receiver which substantially matches the input data stream. The output data stream is shown as a series of pulses 422, 424, 426, 428, 430, 432, 434, 436, 438 and 440.

Figure 5:
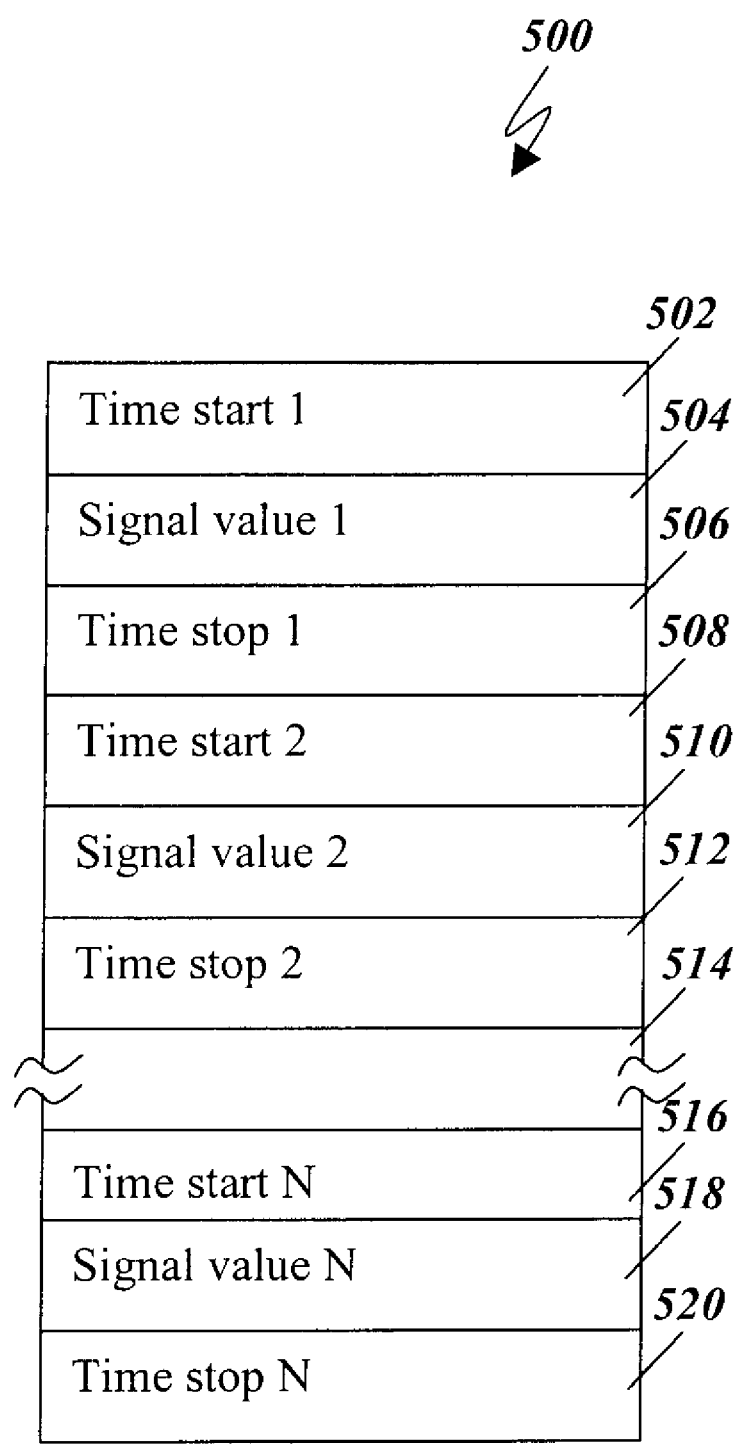
FIG. 5 is a schematic depiction of a data structure provided in another illustrative embodiment.

Turning now to FIG. 5, in an alternative embodiment a data structure is provided comprising data structure fields that retain data that represent data stored in a data buffer. The data structure represents a data buffer that comprises a data value for each signal change detected at the input to the transmitter. It another embodiment changed data values are stored in a data buffer and transmitted from the transmission buffer by the transmitter system to the receiver system. In a real-time transmission mode a signal value start and stop time value and data value are transmitted each time input signal change detection occurs. In a buffered transmission mode, a signal start and stop time is transmitted periodically.

As shown in FIG. 5, a data structure 500 represents the data buffer. At 502 the data structure embedded in a computer readable media, the data structure further includes a field for storing data indicative of a time start for data value for signal value 1 504. At 506 the data structure further includes field for storing data indicative of a stop time value for signal value 1. Another illustrative embodiment provides a data structure field for storing data representing the data buffer containing a signal value for each of a plurality of signal change values. In another particular embodiment, each of the signal values 1-N are presented by data values stored in the data structure. In another particular embodiment, each of the signal values 1-N are represented by data values stored in the fields in the data structure. In another particular embodiment, each of the signal change values 1-N is represented by data values stored in the data structure.

Figure 6:
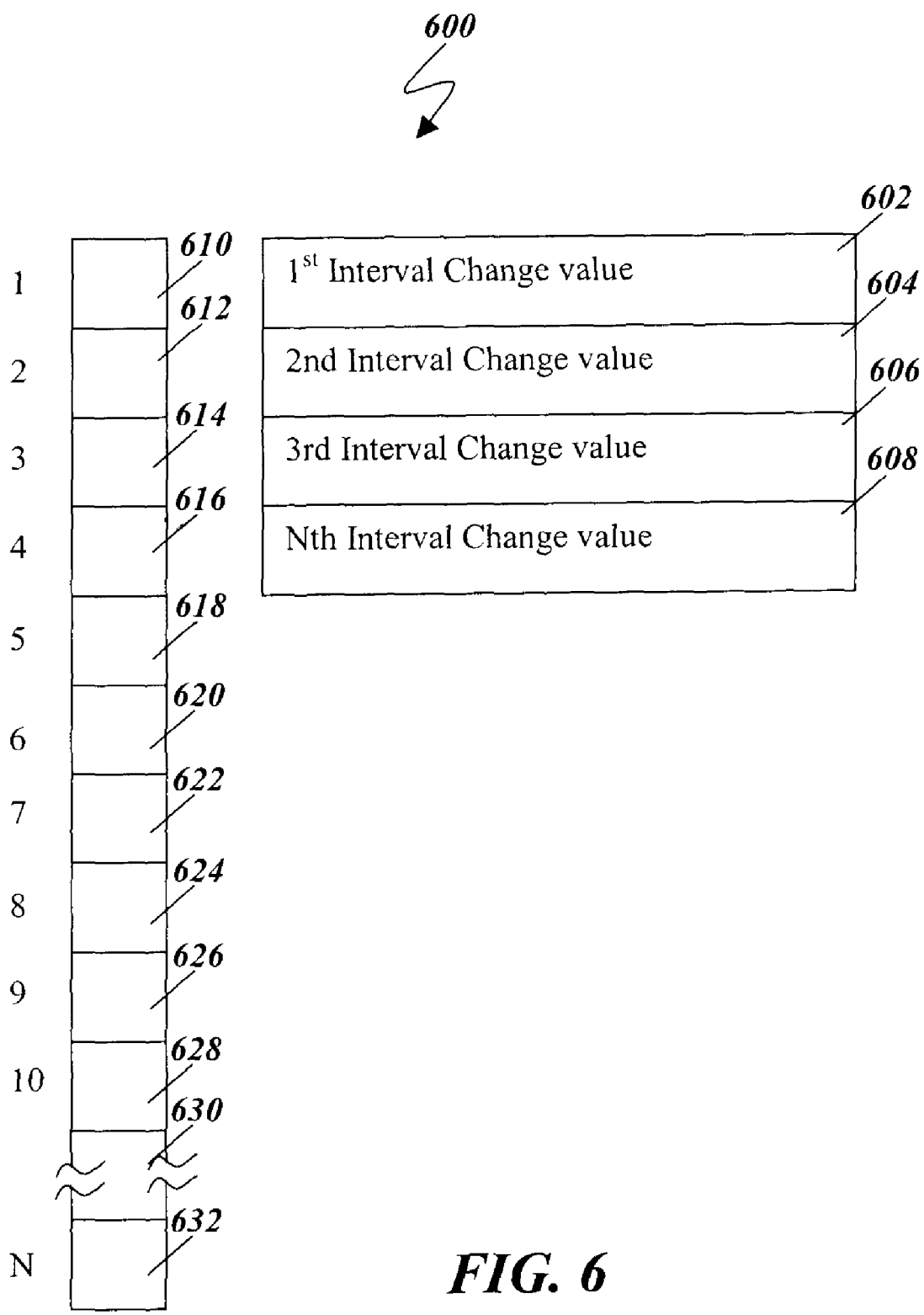
FIG. 6 is a schematic depiction of a data structure provided in another illustrative embodiment.

Turning now to FIG. 6 in another particular embodiment a data structure is provided comprising a bit array representing bits 1 through N and a set of interval change values for intervals 1-N. As shown in FIG. 6 a data structure 600 comprises a set of bits 610, 612, 614, 616, 618, 620, 622, 624, 626, 628, 630 and 632 representing and on off state for bits 1 through N. In another particular embodiment the bit stream 1-N is presented in a bit array that represents changed data values for intervals 1 through N. The interval change data values corresponding to an interval indicated with a bit set to 1, are stored in a bit position in the bit array.

Figure 7:
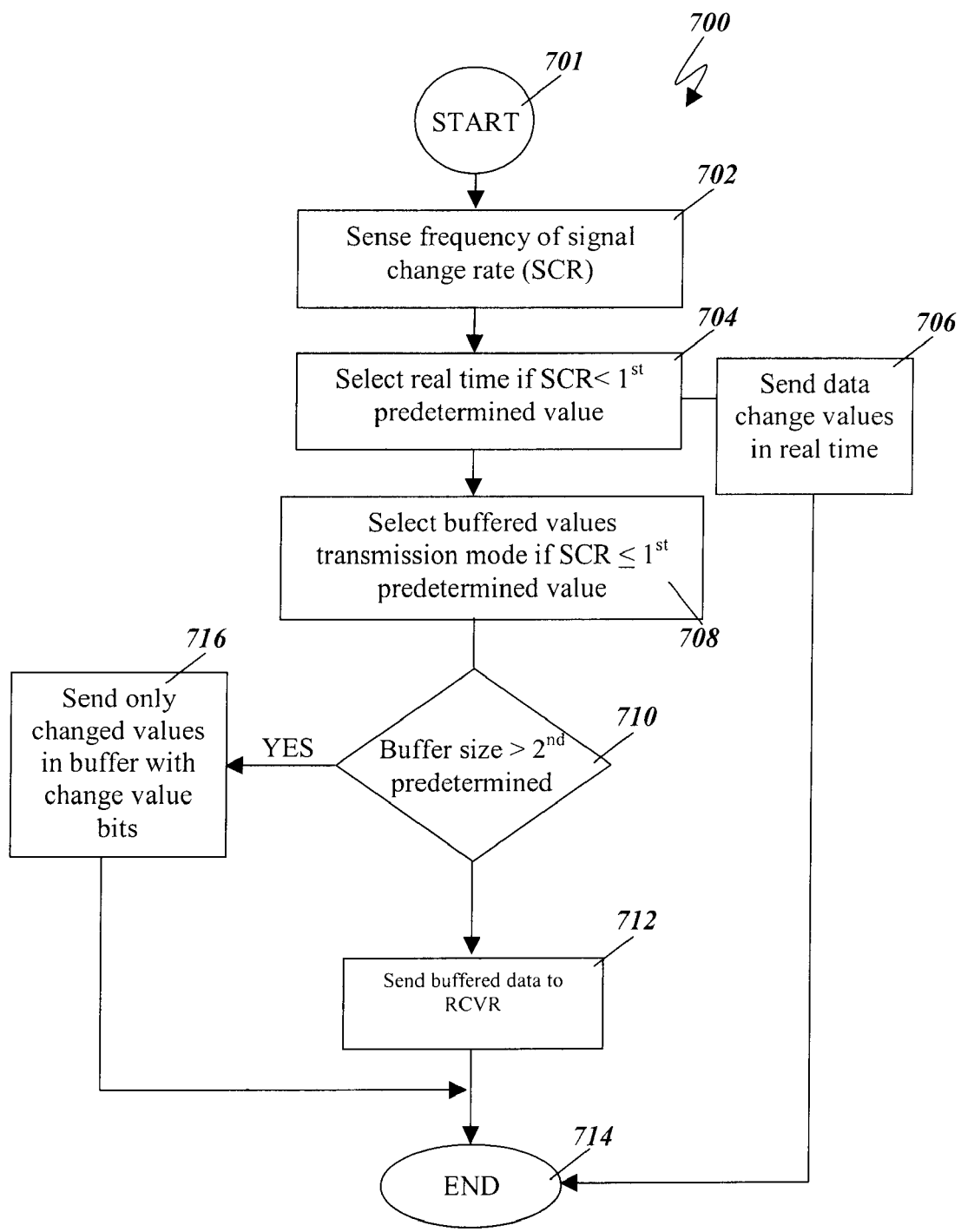
FIG. 7 is a flow chart of functions performed in another illustrative embodiment; data

Turning now to FIG. 7, as shown in FIG. 7, a flowchart 700 a series of functions performed in an illustrated embodiment are depicted. At block 702 a frequency of signal change rate is detected. If the signal change rate is less than a first predetermined value, a real time transmission mode is selected at block 704. In this case the illustrative embodiment proceeds to block 706 and sends a data value in real time from the transmitter system to the receiver system. And the process ends at terminal 714. If the signal change rate is less than the first predetermined value and any buffered transmission mode is selected at block 708. If they available transmission buffer size is greater than a second predetermined value at block 710 then the illustrative embodiment proceeds to block 716 and sends only changed data values in a buffer along with a bit array indicating which intervals correspond to the changed data value. If the available transmission buffer size is less than or equal to the second predetermined value the embodiment proceeds to block 712 and sends the buffered data to the receiver system. The illustrative embodiment then proceeds to terminal 714 and ends.

Figure 8:
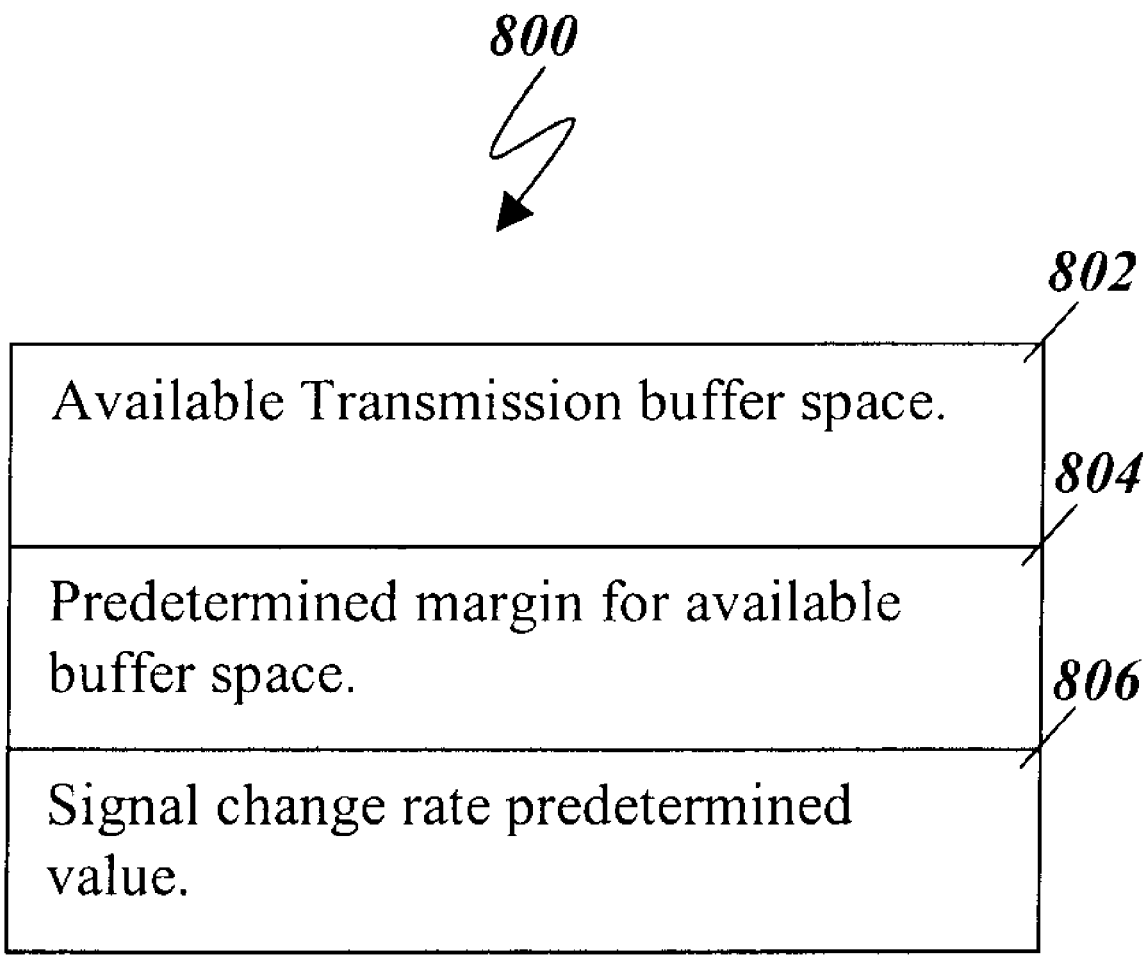
FIG. 8 is a depiction of data structure provided in a illustrative embodiment.

Turning now to FIG. 8, a data structure 800 embedded in a computer readable medium is disclosed. A first field 802 is disclosed for containing data indicative of available transmission buffer space. A second field 804 is disclosed for containing data indicative of a predetermined margin by which the available buffer space must exceed a data buffer size to meet a condition. A third field 806 is disclosed for containing data indicative of a signal change rate below which a real time transmission mode is, selected an above which a buffered transmission mode is selected.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A method for transmitting data in a wireless oil field environment, the method comprising:
   sensing a signal change rate for an input signal from an oil field apparatus; and
   selecting a real time transmission mode when the signal change rate is less than a predetermined value;
   selecting a buffered data transmission mode when the signal change rate is greater than or equal to the predetermined value;
   transmitting the data in the selected transmission mode from a wireless oil field environment;
   sending once per period, a data buffer of N data values representing the input signal when a condition is met; and
   sending once per period a data buffer of changed data values and a set of N bits indicating which of the N data values correspond to the changed data values when the condition is not met.

2. The method of claim 1, wherein the condition further comprises data transmission buffer available space exceeding data buffer size by a predetermined margin.

3. The method of claim 2, the method further comprising, dividing a sampling duration into N intervals, wherein each of the N data values corresponds to one of the N intervals.

4. The method of claim 2, wherein in the set of N bits, bits representing a changed data value are set to one and all other bits are set to zero.

5. The method of claim 3, wherein the number of intervals N is increased as the signal change rate increases.

6. The method of claim 5, wherein the predetermined margin is proportional to N.

7. The method of claim 1, wherein the data buffer further comprises N start time values and N stop time values corresponding to the N data values.

8. The method of claim 1, further comprising:
   receiving the data in the selected transmission mode; outputting the received data as output data, wherein the input data and the output data are signals selected from the group consisting of digital, voltage and current.

9. A system for transmitting data in a wireless oil field environment, the system comprising:
   a processor in data communication with a computer readable medium;
   a computer program embedded in the computer readable medium, the computer program comprising instructions to sense a signal change rate for an input signal from an oil field apparatus, instructions to select a real time transmission mode when the signal change rate is less than a predetermined value and instructions to select a buffered data transmission mode when the signal change rate is greater than or equal to the predetermined value and instructions to transmit the data in the selected transmission mode from a wireless oil field environment
   wherein the buffered data transmission mode further comprises instructions to send once per period, a data buffer of N data values representing the input signal when a condition is met and sending once per period a data buffer of changed data values and a set of N bits indicating which of the N data values correspond to the changed data values when the condition is not met.

10. The system of claim 9, wherein the condition further comprises data transmission buffer available space exceeding data buffer size by a predetermined margin.

11. The system of claim 10, the computer program further comprising instructions to divide a sampling duration into N intervals, wherein each of the N data values corresponds to one of the N intervals.

12. The system of claim 11, wherein in the set of N bits, bits representing a changed data value are set to one and all other bits are set to zero.

13. The system of claim 11, wherein the number of intervals N is increased as the signal change rate increases.

14. The system of claim 13, wherein the predetermined margin is proportional to N.

15. The system of claim 9, wherein the data buffer further comprises N start time values and N stop time values corresponding to the N data values.

16. The system of claim 9, the computer program further comprising:
   instructions to receive the data in the selected transmission mode; and
   instructions to output the received data as output data, wherein the input data and the output data are signals selected from the group consisting of digital, voltage and current.

* * * * *